Figure 1:
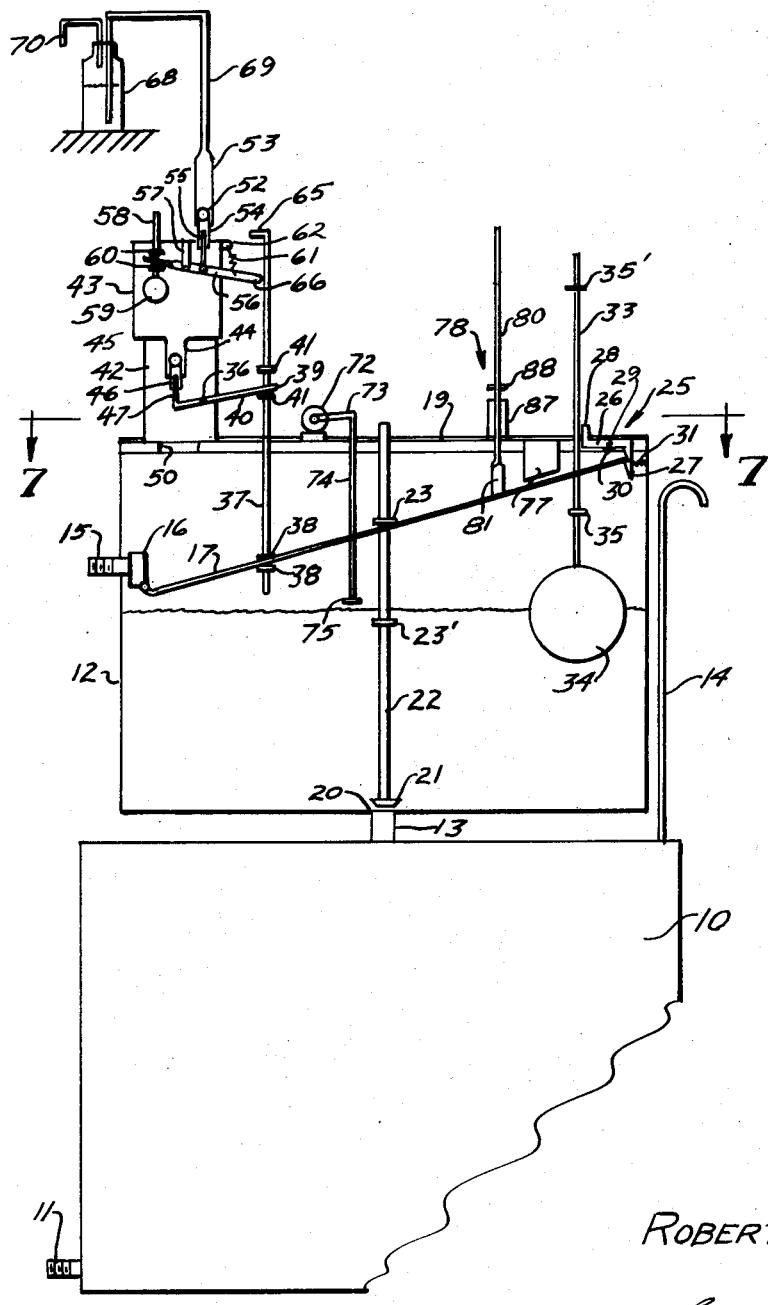

July 12, 1960 R. W. VIS 2,944,560
VETERINARY MEDICAMENT DISPENSER
Filed Nov. 27, 1957 3 Sheets-Sheet 1

ROBERT W. VIS
INVENTOR.
BY
HIS ATT'Y

July 12, 1960 R. W. VIS 2,944,560
VETERINARY MEDICAMENT DISPENSER
Filed Nov. 27, 1957 3 Sheets-Sheet 2
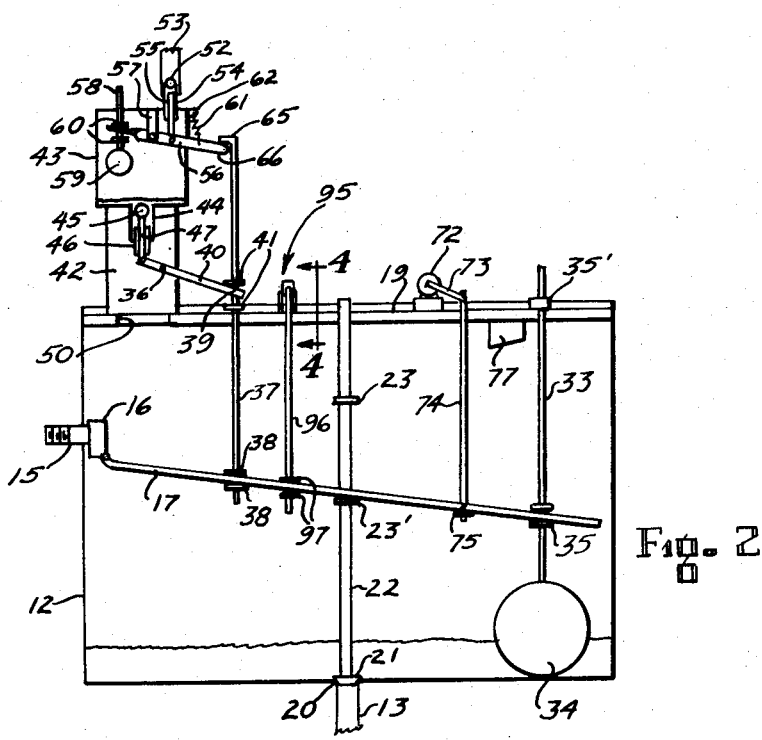
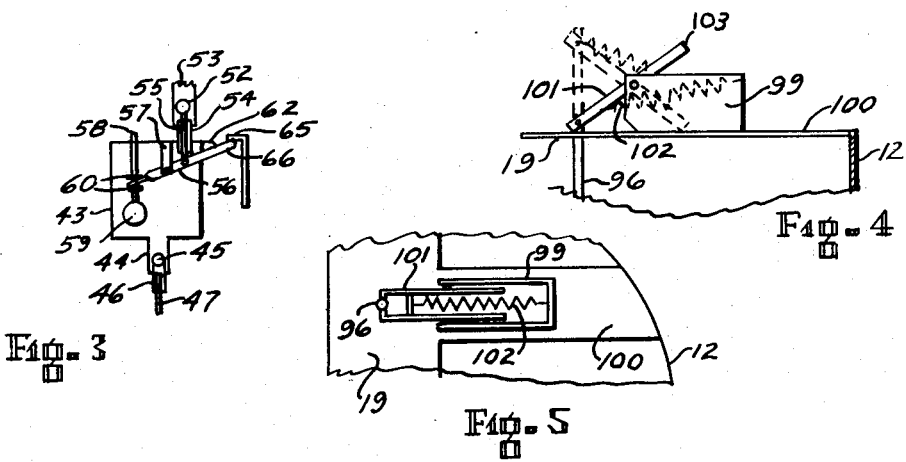
ROBERT W. VIS
INVENTOR.
BY *Lucas J. DeKoster*
HIS ATT'Y

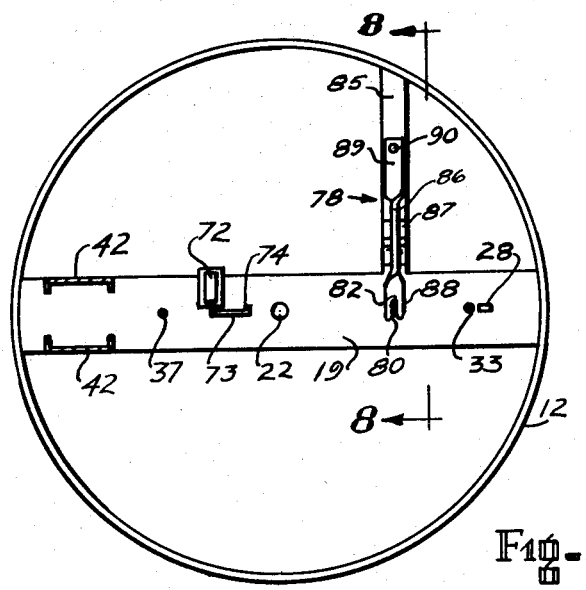
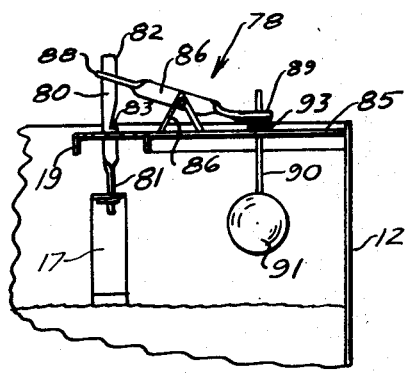
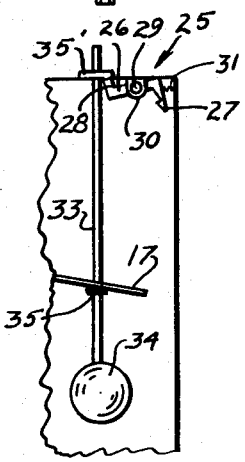

United States Patent Office 2,944,560
Patented July 12, 1960

2,944,560

VETERINARY MEDICAMENT DISPENSER

Robert W. Vis, Orange City, Iowa

Filed Nov. 27, 1957, Ser. No. 699,247

4 Claims. (Cl. 137—101.25)

This invention pertains to medicament dispensers and more particularly to a dispenser of the type which will add a measured amount of veterinary medicament to livestock drinking water.

Recent developments in the veterinary medicament field include that of a class of tonics and remedies for addition, in certain proportions, to the drinking water of livestock and particularly poultry. In the ordinary course of practice these medicaments are measured out and added to a measured amount of water and the mixture placed in drinking tanks or fountains.

However, the larger raisers of poultry, particularly, use automatic water fountains having connection to a pressurized water supply, and no satisfactory way has previously been known to allow an automatically measured amount of the medicament to be mixed into the water in such a system.

By my invention I provide means whereby an automatically measured amount of medicament will be mixed with an automatically measured amount of water so that the mixture will always be of the proper strength. The mixture can then be transmitted through pipes to the fountains or tanks.

A more complete understanding of my invention in its embodiments may be had from a study of the following specification and the figures in which:

Fig. 1 is a partially schematic diagrammatic view of a section through the various tanks of my device, showing one type of snap action control, Fig. 2 is a view similar to that of Fig. 1 of the medicament metering tank and the mixing tank showing the mechanism in its position after the metering tank is emptied and using my preferred snap action device, Fig. 3 is a view of the medicament metering tank in its filling stage, Fig. 4 is a sectional view along line 4—4 of Fig. 2, Fig. 5 is a top plan view of the device of Fig. 4, Fig. 6 is a partial view of the alternative snap action control of Fig. 1 in its position when the upper tank is drained, Fig. 7 is a sectional view along line 7—7 of Fig. 1, Fig. 8 is a sectional view along line 8—8 of Fig. 7.

Briefly my invention comprises a device composed of a mixing tank adapted to be automatically filled with a certain amount of drinking water for livestock or poultry. Emptying into this tank is a measuring compartment adapted to dump a measured amount of medicament into the mixing tank which empties into a storage tank and thence into the watering devices.

More particularly and referring to the figures, my device consists of a storage tank 10 having an outlet 11 which may be connected to any of a number of types of automatic watering devices (not shown) to which the water may run by gravitational means. The storage tank is directly connected to the mixing tank 12 by a pipe 13 or the like so that the liquid can drain from the mixing tank to the storage tank. Vent means 14 may be provided on the storage tank 10 to allow for proper flow into and out of that tank.

The inlet to the tank 12 is from a pipe 15 which is connected to a pressure water system, not shown. A commerical float-controlled type valve 16 of any chosen type is used to control the flow into the tank. This valve is operated by a long operating lever 17 extending into and across the tank. In my diagrammatic view (Figs. 1 and 2) I have shown it extending nearly completely across the tank.

This is not necessary and if the operating means can be compacted the arm could be correspondingly shorter. After I have completed the description of the device it will be obvious that some of the operating means could be set side by side, or otherwise brought closer together. However, for ease of description, I have shown them strung out along the lever.

It will be obvious also, to those skilled in the art that the two tanks could be made as a unitary piece having a water tight partition between the upper and lower compartments forming the two tanks. It will also be apparent that the vent could be contained within the upper of the two compartments, and vent above the liquid level in that compartment.

In this specification I will first describe my invention in its earlier experimental embodiment which differs from my preferred embodiment by the use of a snap action device for holding the lever 17 which is not as efficient nor as simple as my preferred device. The early embodiment is shown in Figs. 1, 6, 7, and 8. Figs. 2 and 3 also show much of the mechanism which is common to both embodiments.

The principal operating mechanism is mounted on a cover or cross brace 19 on the tank 12. I have shown a brace of inverted channel section, but it will be recognized that a full cover could be used. The outlet 20 from the tank 12 is controlled by a valve 21 having a stem 22 slidably journalled in the brace 19. The stem also extends through an opening in the lever 17 which is free to move past the stem except for an upper collar 23 and a lower collar 23'. These collars are adjustably fixed to the stem 22 for the operation of the valve as will appear hereinafter.

In its normal or upper position in my early model as shown in Fig. 1, the lever 17 is held by a latch means 25 consisting of a latch lever 26 having a hook 27 engaging the operating lever 17 and a release arm 28 extending upward above the brace 19. The latch lever 26 is pivoted to the brace by means of a pin 29 which may extend through ears 30 either formed in or fastened onto the brace 19. A spring 31 engaged between the latch lever 26 or some part thereof and the tank 12 or the brace 19 is adapted to urge the hook 27 to an engaged position with the operation lever 17.

The latch is controlled by a float mechanism consisting of a float rod 33 slidably journalled in the brace 19. On its lower end the rod carries a float 34 adapted to rise and fall with the level of the liquid in the tank 12. This float rod 33 also passes freely through the operating lever 17 but has a lower collar 35 adapted to engage the lever 17 to raise it as the liquid level rises after the lever is tripped, as will appear hereinafter. An upper collar 35' is also fixed to the rod 33 for a purpose to be described in connection with the description of the operation of my device.

The medicament metering and discharge means, which is common to both embodiments of my invention, is also controlled by the operating lever 17 through a link 37 coupled to the lever 17 by collars 38 fixed adjustably on the link and astraddle of the lever. Thus vertical movement of the lever 17 is transmitted to the link 37. This link is slidably journalled in the brace 19 for vertical movement only. Movement of the link 37 in a vertical direction is adapted to operate a dumping lever 40. One end 39 of this dumping lever embraces the link 37 and is held in controllable longitudinal location thereon by collars 41 so that vertical movement of the link will cause similar movement of that end of the lever.

The lever 40 is pivoted at 36 to a support 42 which is fixed to the brace 19. The support may be of inverted channel shape adapted to support a medicament metering tank 43 thereon. The metering tank 43 has a tubular depending exit 44 which encloses a simple ball check valve including a ball 45 and an inner seat tube 46 on which the ball seats to close the valve. An operating finger 47 slides in the inner tube 46 and is pivotally attached to the lever 40 so that when the end 39 of the lever 40 is up as shown in Fig. 1, the finger 47 is free of contact with the ball 45, but when the end 39 of the lever is depressed (Fig. 2) the finger engages the ball to unseat it and allow fluid to flow past.

In the figures I have shown the discharge from the inner tube 46 to be free whereby a liquid discharged from that tube would fall freely onto the brace 19 or through an opening 50 therein. It will be apparent that this discharge could be guided and controlled by pipes or tubes or the like.

The inlet to the metering tank 43 is controlled by a similar ball valve having a ball 52 loosely disposed in an outer tube 53. A seat tube 54 is fixed within the outer tube 53 and is formed to be closed by the seating of the ball 52 on its upper end. A finger 55 is pivoted to an operating lever 56 and is adapted to engage the ball to raise it and open the valve on suitable movement of the lever 56.

The lever 56 is pivotally mounted on a mounting 57 fixed to the tank 43. A float mechanism including a float rod 58 extending through the lever 56 at a location opposite the pivot from the finger 55 controls the action of the lever. The rod 58 is slidably journalled in the upper surface of the tank 43 and carries a float at its lower end. Collars 60 adjustably fixed on the rod 58 transmit vertical motion of the rod 58 to the end of the lever 56. A tension spring 61 engaged between the lever 56 and an ear 62 on the tank 43 urges the lever in a direction which would open the valve. The float device tends to close it against the action of the spring when the metering tank is full. Both of these devices may be overruled by a hook 65 on the end of the link 37 which is adapted to engage an extended end 66 of the lever 56 when that link is in a lowered position as shown in Fig. 2.

The inlet to the tank 43 is through the outer tube 53 which is connected to a source of medicament in the form of a bottle, jug or other container 68 which is preferably mounted at a higher elevation than the tank 43 so that the medicament will flow downward into the tank by gravitational means, and that it may be siphoned out of the container. The tube 69 which connects the container 68 to the tank 43 may form the siphon since it will normally be always full. A vent tube 70 is also provided and air pressure on this tube may be used to start the flow through the tube 69 and thereby start the siphon.

A counter 72 is provided to record the number of cycles the equipment makes between readings. This may be of interest to the owner as a record of the amount of dosage or of the amount of water consumed. An arm 73 operates the counter through a link 74 having a head 75. The head is positioned so that the operating lever 17 will engage it to operate the counter when the head is fully lowered.

A stop 77 is provided on the brace 19 to prevent overtravel in an upward direction of the lever 17. This is particularly important in the operation of the snap action 78 hereinafter described. The snap action device 78, while not absolutely necessary in this embodiment, is desirable for reasons to be explained in connection with the operation of my device.

The operation of this embodiment of my invention can best be described with reference to the figures starting from the position of the various mechanisms as shown in Fig. 1 where the device is full. The storage tank 10 is full of the mixture of water and medicament, and the mixing tank 12 is also filled to the level where the float 34 closes the inlet valve 16.

At this point, the lever 17 is held in its upward position by the hook 27. The float 34 is free to follow the level of the mixture in the tank within the limits prescribed by the collars 35 and 35'. The valve 21 is held open by the engagement between the lever 17 and the collar 23. Thus the liquid flows freely from the mixing tank 12 to the storage tank 10.

The medicament measuring apparatus is also shown in a static state. The link 37 is held in its uppermost position by the engagement of the collars 38 with the lever 17. This results in the engagement of the collars 41 with the end 39 of the lever 40 to hold that end in a raised position. This causes the finger 47 to be held out of engagement with the ball 45 which seats on the tube 46 preventing flow of any medicament into the tank 12.

The float 59 in the medicament metering tank 43 is shown in Fig. 1 in a "full" position where the metering tank has been filled with the proper dosage of the medicament. In this position the float has drawn the finger 55 down so that the ball 52 seats on the tube 54 preventing flow of any additional medicament.

With the elements in this position to start, the mixture may be drained from the storage tank 10 and mixing tank 12 through the outlet 11. As the liquid level in the mixing tank drops, the float 34 is lowered to substantially the position shown in Fig. 6. At that point the upper collar 35' on the float rod 33 engages the release arm 28 and trips the latch means 25 allowing the operating lever to fall to the position in Fig. 6. This position corresponds to the position shown in Fig. 2 insofar as the operation of the medicament metering device is concerned. The falling of the operating lever performs several operations. First the outlet valve 21 is caused to seat preventing further flow from the mixing tank. This does not interfere with any function of the watering mechanism because flow is still maintained from the storage tank 10. The fall of the arms also operates the counter 72 as will be obvious, by pulling down the arm 73.

A third operation performed by the falling of the lever 17 includes opening the valves which serve to fill the tank 12 with the mixture. The float valve 16 is opened simply because the lever drops as would any float controlled valve. The medicament is dropped into the tank 12 by the lifting of the ball 45 from its seat on the tube 46 which allows the liquid to flow past the ball and drop into the tank 12. The lifting of the ball is caused by the lever 17 pulling down the link 37 which actuates the lever 40 through the collar 41 to push the finger 47 against the ball and raise it. At the same time, the hook 65 on the link 37 catches the end 66 of the lever 56 to hold it down, keeping the finger 55 from unseating the ball 52 as is shown in Fig. 2. Thus only the medicament which is in the metering tank 43 is dumped into the mixing tank 12. In this way only a measured amount of medicament is dumped into a measured amount of mixture.

As the water enters the tank 12 filling it, the float 34 rises lifting the lever 17 by means of the collar 35. This has no effect for some time, on the valve 21 since the lever 17 slides over the stem 22. The link 37 is raised however, by the rising lever 17, thus moving the dumping lever 40 and allowing the operating lever 56 to move to the position shown in Fig. 3. In that position, the finger 47 has been withdrawn sufficiently so that the ball 45 is again seated on the tube 46 closing the valve. The lever 56 is just freed from the hook 65 so that it is under the control of the float 59. It will be apparent that, to obtain the proper interaction of these two valve mechanisms, it may be necessary to adjust the collars 41 on the link 37. The desired action is to close the ball valve at the lower part of the tank which includes the ball 45, just before the ball 52 is unseated from its tube 54 by the dropping of the float 59.

In the position of the mechanism shown in Fig. 3, the medicament is free to flow through the tube 53 from the container 68 into the metering tank 43. As this flow continues, the float 59 rises, gradually dropping the ball 52 until, at a predetermined level, the ball 52 again seats on the tube 54 shutting off the flow with a metered amount of medicament in the tank 43 ready for the next cycle when it will be dumped into the mixing tank 12 to be mixed with the water entering the tank as has been described.

In normal operation it is possible that the lever 17 would be carried upward into engagement with the hook 27 of the latch means and be re-engaged and the cycle repeated. However, the weight of the valve stem 22 and valve 21 which must be raised by the lever 17 combined with the resistance of the latch lever 26 to displacement, and the friction of the other members make this operation not a positive one. Therefore, in this early embodiment, I provide a snap action device 78, best shown in Figs. 7 and 8.

The snap action device 78 includes a bar 80 pivotally fastened to the lever 17 so that it can pivot to the right or left as shown in Fig. 1. The bar is preferably flat and twisted as shown in Fig. 8, so that the upper part of the bar may move transversely of the lever by a springing action of the lower flat part 81. Preferably the spring resistance is slight so that not much force is required to move it in this direction for reasons to be hereinafter explained.

The bar 80 extends through an opening in the brace 19 and is adapted to slide freely therethrough, although the spring action should be such as to urge one edge 82 (Fig. 8) into contact with the edge of the opening. A notch 83 is provided in the edge 82 adapted to engage the brace 19 when the bar 80 is moved upward. In this respect, it will be noted that as the tank 12 is filling from the position shown in Fig. 6, the lever 17 will carry the bar 80 upward until the notch 83 does engage the brace 19 and will thereafter be held in that position until the bar is released. The catch position just described is such that the valve 16 remains partially open so that water continues to flow into the tank 12 causing the water level to rise relative to the float 34. This results in a greater upward buoyant force as the float becomes submerged, and a consequent greater upward force on the lever 17. This stored energy, if suddenly released will result in a snapping upward of the lever 17.

The release mechanism, as best shown in Fig. 8, is mounted on a cross member 85 extending from the brace 19 to the edge of the tank 12. This mechanism includes a lever 86 pivoted to a bracket 87 on the member 85. One end of the member comprises a fork 88 embracing the bar 80 and adapted to slidably engage the edge 82 of that bar. The other end 89 of the lever is formed to provide an opening to receive a float rod 90 to which is attached an auxiliary float 91 within the tank 12. The rod 90 is slidably journalled in the member 85 for vertical motion. A collar 93 on the rod 90 between the end 89 and the brace 85 limits the motion of the float 91.

As the liquid in the tank 12 is drained out, the float 91 is held out of contact therewith by the collar 93 hanging on the member 85. This is the position shown in Fig. 8. When the lever 17 is dropped, it will be apparent that the rod 80 will also drop with it. Then when the tank is filling, the notch 83 will catch on the member 85 in the catch position as described above. Further rising of the liquid level will eventually cause the float 91 to rise till the collar 93 engages the end 89 of the lever 86. Motion of this end of the lever will cause the fork 88 to push the bar 80 laterally until the notch 83 is disengaged. At this level, the main float 34 will be nearly submerged so that considerable force will be imposed on the lever 17 to snap it into latched engagement with the latch hook 27, the position shown in Fig. 1. In this position the valve 16 is shut off so that there will be no further flow of liquid into the tank 12 until the next cycle.

My preferred device is similar in construction and operation to the earlier model described hereinbefore. The principal difference is in the type of snap action device. In the preferred embodiment, the counter 72 with its link 74 may be moved nearer the float rod 33 so that the preferred snap action device 95 may operate on a shorter stroke.

The preferred snap action is simply an over-the-center spring action device best shown in Figs. 4 and 5. The main bar 96 is coupled to the lever 17 by a pair of collars 97, one above and one below the arm. Thus movement of the lever 17 is transmitted to the bar 96, and vice versa.

The snap action itself comprises a bracket 99 mounted on a leg 100 of the brace 19. A control arm 101 is pivotally connected at one end of the bar 96. Thus vertical movement of the bar 96 will cause pivotal movement of the arm 101. A tension spring 102 is connected between the bracket 99 and the arm 101 so that it is more relaxed when the arm is at either of its extreme positions than it is in the center of travel. By this common expedient, the arm 101 in moving from one position to the other stores energy in the spring during the first part of the motion, which energy is released during the latter part of the motion. Thus the stored energy causes a snap movement of the arm as it goes past the center of motion. The end 103 of the arm 101 may be of such length that it contacts the surface of the leg 100 at the upper position of the bar 96. This contact forms the stop which limits the travel of the bar 96 in an upward direction. Travel of the bar downward is limited by the position of the lever 17 as shown in Fig. 2.

It will be obvious that, by use of a properly proportioned spring 102, this snap action device will perform substantially the same function as the latch and snap device 25 of the originally described embodiment. Thus starting from a filled position, the float 34 will follow the level of the mixture downward as the tank is drained. In so doing, the arm 101 will be pulled downward loading the spring 102 in tension. As the arm is lowered farther, the spring is fully loaded and the arm passes the point where the tension of the spring pulls on a line through the pivot point of the arm. As this point is passed, the spring tension pulls the arm downward to the full-line position shown in Figure 4 with a quick action, forcing the float downward into the liquid to the position shown in Figure 2 with the resultant opening of the valve 16 and seating of the valve 21.

It will be apparent that there are many adjustments which can be made to time the cycles correctly in either embodiment. For these adjustments I have provided adjustable collars and the like. However, it is conceived that many of these adjustments could be made on only the experimental units and that the production models as used commercially could be made to proper specifications without the need for these adjustments. Thus it will be apparent that where I have described adjustable collars and the like, that fixed collars or similar devices could also be used.

It will also be apparent that electrical switches and relays might be used in the place of many of the mechanical controls shown. It is believed that this would result in an unduly expensive device, however, so that the mechanical controls are preferred.

Having thus described my invention in two embodiments, I am aware that numerous and extensive departures may be made therefrom without departing from the spirit and scope of my invention as limited only by the following claims.

I claim:

1. In combination, a mixing tank and a medicament metering tank, said tanks being interconnected so that the metering tank is adapted to discharge into said mixing tank, inlet valve means and outlet valve means in said mixing tank, control means interconnecting said valve means so that when one valve is opened the other is closed, said control means including float means adapted to operate said control means to cause said inlet valve means to fill said mixing tank to a predetermined level, outlet valve means in said metering tank operably connected to said control means and adapted to discharge a metered amount of medicament or the like from said metering tank into said mixing tank, said control means being adapted to cause said discharge only when the outlet valve means in said mixing tank is closed and said inlet valve is open, supply means connected to said metering tank and valve means between said supply means and said metering tank, metering control means for said last named valve means adapted to cause a metered amount of medicament to flow into said metering tank only when said metering tank has been emptied and said outlet means in said metering tank is closed, said metering control means including float means to control the level of medicament in said metering tank, and means engageable between said metering control means and said first named control means to overrule said float means while said metering tank is being emptied.

2. A medicament dispenser comprising in combination a mixing tank, inlet valve means in said mixing tank, lever means on said valve means adapted to open and close said valve means, said lever means having a predetermined upper position and a predetermined lower position, said valve means being open when said lever is in said lower position and closed when said lever means is in said upper position, outlet valve means in said tank operably connected to said lever means so that said outlet valve means is open when said lever means is at its upper position and closed when said lever means is at its lower position, float means on said lever means adapted to move said lever means depending on the level of liquid in said tank, metering tank means connected to said mixing tank and adapted to discharge thereinto, discharge valve means on said metering tank means, discharge control means for said discharge valve means operably connected to said lever means whereby the opening and closing of said discharge valve means is controlled by the position of said lever means, and inlet valve means in said metering tank means adapted to be controlled by the level of contents in said metering tank means, said control means for said discharge valve means being formed and positioned to operably engage said inlet valve means in said metering tank means to overrule said control of the level of contents.

3. A medicament dispenser comprising in combination a mixing tank, inlet valve means in said mixing tank, lever means on said valve means adapted to open and close said valve means, said lever means having a predetermined upper position and a predetermined lower position, said valve means being open when said lever is in said lower position and closed when said lever means is in said upper position, outlet valve means in said tank operably connected to said lever means so that said outlet valve means is open when said lever means is at its upper position and closed when said lever means is at its lower position, float means on said lever means adapted to move said lever means depending on the level of liquid in said tank, metering tank means connected to said mixing tank and adapted to discharge thereinto, discharge valve means on said metering tank means, discharge control means for said discharge valve means operably connected to said lever means whereby the opening and closing of said discharge valve means is controlled by the position of said lever means, an inlet valve in said metering tank means, inlet control means for said last named inlet valve, said inlet control means being of the type to be controlled by the level of contents of said metering tank means, said discharge control means being operably connectible to said inlet control means to overrule said inlet control means at certain positions of said discharge control means.

4. A medicament dispenser comprising in combination a mixing tank, inlet valve means in said mixing tank, lever means on said valve means adapted to open and close said valve means, said lever means having a predetermined upper position and a predetermined lower position, snap action means connected to said lever means adapted to hold said lever means at one of said predetermined positions until a definite amount of force is applied to said snap action means in a direction to move said lever means to its opposite position, said valve means being open when said lever is in said lower position and closed when said lever means is in said upper position, outlet valve means in said tank operably connected to said lever means so that said outlet valve means is open when said lever means is at its upper position and closed when said lever means is at its lower position, float means on said lever means adapted to move said lever means depending on the level of liquid in said tank, metering tank means connected to said mixing tank and adapted to discharge thereinto, discharge valve means on said metering tank means, discharge control means for said discharge valve means operably connected to said lever means whereby the opening and closing of said discharge valve means is controlled by the position of said lever means, an inlet valve in said metering tank means, inlet control means for said last named inlet valve, said inlet control means being of the type to be controlled by the level of contents of said metering tank means, said discharge control means being operably connectible to said inlet control means to overrule said inlet control means at certain positions of said discharge control means.

References Cited in the file of this patent

UNITED STATES PATENTS

| | | |
|---|---|---|
| 871,461 | Gundy | Nov. 19, 1907 |
| 885,828 | Bartlett | Apr. 28, 1908 |
| 1,997,970 | Hutchinson | Apr. 16, 1935 |
| 2,678,917 | Schoenfeld | May 18, 1954 |